United States Patent
Zhao

(10) Patent No.: US 8,009,076 B2
(45) Date of Patent: Aug. 30, 2011

(54) INTERMEDIATE FREQUENCY RECEIVING CIRCUIT AND INTERMEDIATE FREQUENCY RECEIVING METHOD

(75) Inventor: Guixue Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 12/485,161

(22) Filed: Jun. 16, 2009

(65) Prior Publication Data

US 2009/0251348 A1    Oct. 8, 2009

Related U.S. Application Data

(63) Continuation of application No. PCT/CN2008/070022, filed on Jan. 4, 2008.

(30) Foreign Application Priority Data

May 18, 2007    (CN) .......................... 2007 1 0107958

(51) Int. Cl.
*H03M 1/12*    (2006.01)
(52) U.S. Cl. ....................................... 341/155; 341/139
(58) Field of Classification Search ................... 341/139, 341/155
See application file for complete search history.

(56) References Cited

U.S. PATENT DOCUMENTS

| | | | | |
|---|---|---|---|---|
| 5,282,227 A | * | 1/1994 | Crawford | 375/327 |
| 6,118,499 A | * | 9/2000 | Fang | 348/726 |
| 6,434,374 B1 | | 8/2002 | Muterspaugh | |
| 6,738,609 B1 | | 5/2004 | Clifford | |
| 7,023,472 B1 | * | 4/2006 | Kang et al. | 348/187 |

FOREIGN PATENT DOCUMENTS

| | | |
|---|---|---|
| CN | 1291380 A | 4/2001 |
| CN | 1540873 A | 10/2004 |
| CN | 101056113 A | 10/2007 |
| GB | 2 319 911 A | 6/1998 |

OTHER PUBLICATIONS

European Patent Office, Extended European Search Report in European Application No. 08700048.5 (May 6, 2010).

* cited by examiner

*Primary Examiner* — Khai M Nguyen
(74) *Attorney, Agent, or Firm* — Leydig, Voit & Mayer, Ltd.

(57) ABSTRACT

An intermediate frequency receiving circuit and an intermediate frequency receiving method are provided. The intermediate frequency receiving circuit includes an inductor-capacitor (LC) resonance circuit whose primary resonance frequency is a central frequency of received signals. The LC resonance circuit receives intermediate frequency signals and suppresses transmitted signals and control signals. A band-pass filter connected to the LC resonance circuit filters the transmitted signals and control signals. An automatic gain control circuit connected to the band-pass filter compensates the attenuation of an intermediate frequency cable. A low-pass filter connected to the automatic gain control circuit compensates an in-band flatness. An analog-to-digital converter connected to the low-pass filter performs a sampling and digital demodulation on the received signals.

19 Claims, 8 Drawing Sheets

INTERMEDIATE FREQUENCY RECEIVING CIRCUIT AND INTERMEDIATE FREQUENCY RECEIVING METHOD

CROSS-REFERENCE TO RELATED APPLICATIONS

This application is a continuation of International Patent Application No. PCT/CN2008/070022, filed Jan. 4, 2008, which claims priority to Chinese Patent Application No. 200710107958.0, filed May 18, 2007, both of which are hereby incorporated by reference in their entirety.

FIELD OF THE TECHNOLOGY

The present invention relates to a receiving technology of a microwave system, and more particularly to an intermediate frequency receiving circuit and an intermediate frequency receiving method in the communication field.

BACKGROUND

Referring to FIG. 1, an indoor unit and an outdoor unit in a microwave system are usually separately installed and connected by an intermediate frequency cable adapted to transmit/receive intermediate frequency signals, transmit/receive control signals, and supply power. For a large capacity microwave system, the performance indexes of an intermediate frequency receiving circuit have direct impact on the sensitivity of the system, and accordingly, the significance of the intermediate frequency receiving circuit is obvious.

The critical indexes of the intermediate frequency receiving circuit include reflection factor, in-band flatness, suppressing degree of the transmitted signals and control signals, dynamic range, group delay characteristics, and the like.

As for an intermediate frequency receiving channel of the indoor unit in the microwave system, referring to FIG. 2, a prior intermediate frequency receiving circuit generally performs band-pass filtering first, then amplification and filtering, analog-to-digital conversion sampling, and finally digital demodulation.

During the research, the inventor of this application discovers that although the prior intermediate frequency receiving circuit satisfies the functional requirements, it is unable to provide desired intermediate frequency receiving channel indexes. In particular, the prior intermediate frequency receiving circuit at least has the following disadvantages in terms of the performance indexes:

(1) The in-band unflatness index is not ideal. The prior intermediate frequency receiving circuit separates the receiving circuit from other circuits by a band-pass filter. For a large capacity microwave, the bandwidth for transmitting/receiving the intermediate frequency signals is up to 28 MHz, and the 3 dB bandwidth of the filter becomes even larger when the in-band unflatness is less than 1 dB. Meanwhile, the frequencies of transmitting and receiving the intermediate frequencies are only separated by little more than 200 MHz, so that a steep transition band of the filter becomes necessary in order to reduce the interference between the transmitting/receiving channels. However, the steep transition band of the band-pass filter contradicts the in-band flatness (the condition of the wideband), and the two are difficult to become optimal at the same time. For example, the prior intermediate frequency receiving circuit has in-band unflatness lower than 1 dB.

(2) The improvement of the reflection factor is little. As for the wideband, in the prior intermediate frequency receiving circuit, due to the wideband characteristics assumed by the input impedance of the amplifier and influences from an intermediate frequency port protection circuit, it is difficult to improve the reflection factor by adjusting the band-pass filter of the receiving channel without affecting the in-band flatness of the band-pass filter, and the discreteness is also large. For example, the reflection factor of the port in the prior intermediate frequency receiving circuit is generally −15 dB.

(3) The receiving sensitivity of the system is not high. For example, the prior intermediate frequency receiving circuit generally has a receiving sensitivity of about −69 dBm in a 128 quadrature amplitude modulation (128 QAM) mode.

(4) The suppressing of the transmitted intermediate frequency signals and low frequency control signals is not high and generally around 60 dB.

SUMMARY

The embodiments of the present invention are directed to an intermediate frequency receiving circuit and an intermediate frequency receiving method capable of providing desired intermediate frequency receiving channel indexes, improving the in-band unflatness and reflection factor, enhancing the suppressing degree of the transmitted intermediate frequency signals and low frequency control signals, improving the receiving sensitivity of the system, reducing the in-band loss, and providing a variable gain.

The embodiments of the present invention provide an intermediate frequency receiving circuit. The intermediate frequency receiving circuit includes an inductor-capacitor (LC) resonance circuit whose primary resonance frequency is substantially equal to a central frequency of received signals, adapted to receive intermediate frequency signals and suppress transmitted signals and control signals; a band-pass filter connected to the LC resonance circuit and adapted to filter the transmitted signals and control signals; an automatic gain control circuit connected to the band-pass filter and adapted to compensate the attenuation of an intermediate frequency cable; a low-pass filter connected to the automatic gain control circuit and adapted to compensate an in-band flatness; and an analog-to-digital converter connected to the low-pass filter and adapted to perform a sampling and digital demodulation on the received signals.

In the above technical solution, the LC resonance circuit whose primary resonance frequency is a central frequency of the received signals suppresses the transmitted signals and control signals while receiving the intermediate frequency signals, so as to enhance the receiving sensitivity of the system and improve the reflection factor. The band-pass filter further filters the transmitted signals and control signals. The automatic gain control circuit compensates the attenuation of the intermediate frequency cable to provide a variable gain and reduce the in-band loss. The low-pass filter compensates the in-band flatness. Finally, the analog-to-digital converter performs a sampling and digital demodulation on the received signals. Through an organic combination of the above circuits, the indexes of the intermediate frequency receiving circuit in the microwave system are optimized and adjusted, so that the whole intermediate frequency receiving circuit may achieve the desired intermediate frequency receiving channel indexes, improve the in-band unflatness and reflection factor, enhance the suppressing degree of the transmitted intermediate frequency signals and low frequency control signals, improve the receiving sensitivity of the system, reduce the in-band loss, and provide a variable gain.

The embodiments of the present invention provide an intermediate frequency receiving method. The method includes receiving intermediate frequency signals and suppressing transmitted signals and control signals; performing a band-pass filtering on the intermediate frequency signals with the transmitted signals and control signals being suppressed; performing an automatic gain control on the band-pass filtered intermediate frequency signals; performing a low-pass filtering on the automatically gain-controlled intermediate frequency signals; and performing an analog-to-digital conversion on the low-pass filtered intermediate frequency signals.

In the above technical solution, by suppressing the transmitted signals and control signals while receiving the intermediate frequency signals, the receiving sensitivity of the system is enhanced and the reflection factor is improved. The transmitted signals and control signals are further filtered by performing a band-pass filtering. The attenuation of the intermediate frequency cable is compensated by automatic gain control, so as to provide a variable gain and reduce the in-band loss. The in-band flatness is compensated by performing a low-pass filtering. Finally, the sampling and digital demodulation is performed by analog-to-digital conversion. Through an organic combination of the above operations, the indexes of the intermediate frequency receiving circuit in the microwave system are optimized and adjusted, so that the whole intermediate frequency receiving circuit may achieve the desired intermediate frequency receiving channel indexes, improve the in-band unflatness and reflection factor, enhance the suppressing degree of the transmitted intermediate frequency signals and low frequency control signals, improve the receiving sensitivity of the system, reduce the in-band loss, and provide a variable gain.

DETAILED DESCRIPTION

The technical solutions of the present invention are described in detail below through some exemplary embodiments with the accompanying drawings.

Figure 1:
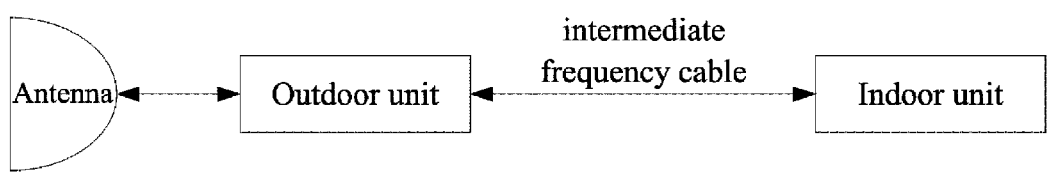
FIG. 1 is a schematic view of a microwave system.
Figure 2:
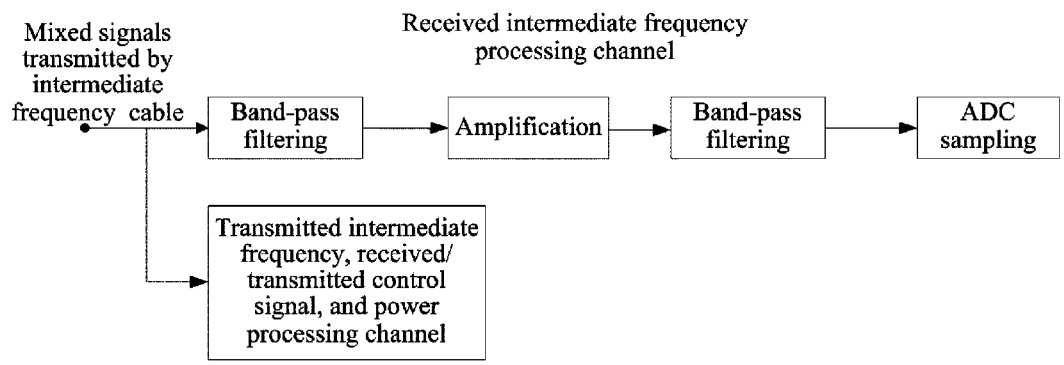
FIG. 2 is a schematic view of an intermediate frequency receiving circuit.
Figure 3:
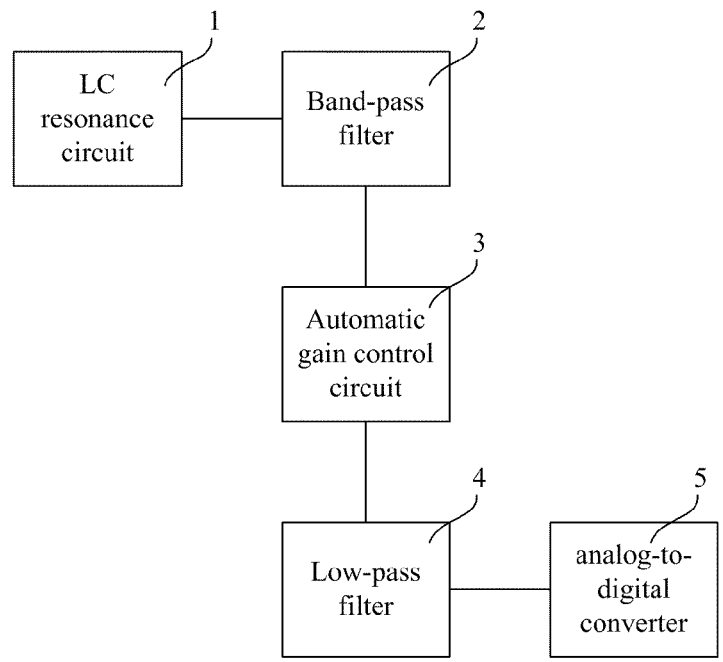
FIG. 3 is a schematic view of an intermediate frequency receiving circuit according to a first embodiment of the present invention.

Referring to FIG. 3, the first embodiment of the present invention provides the intermediate frequency receiving circuit including an LC resonance circuit 1, a band-pass filter 2, an automatic gain control circuit 3, a low-pass filter 4, and an analog-to-digital converter 5 electrically connected in sequence.

A primary resonance frequency of the LC resonance circuit 1 is a central frequency of received signals, so as to suppress signals with a central frequency different from that of the received signals while receiving the intermediate frequency signals, i.e., to suppress transmitted signals and control signals. Therefore, the LC resonance circuit 1 separates the receiving channel from the transmitting channels and control channels. Besides, the transmitting channels sharing the same intermediate frequency interface may also adopt an LC resonance circuit whose primary resonance frequency is a central frequency of the transmitted signals, thus further ensuring that the filters for individual channels no longer interfere with each other. The band-pass filter 2 is adapted to further filter the transmitted signals and control signals based on that the LC resonance circuit 1 suppresses the transmitted signals and control signals, so as to prevent the transmitted signals and control signals from influencing the received signals, thereby increasing the receiving sensitivity of the system and improving the reflection factor. The automatic gain control circuit 3 is adapted to perform an automatic gain control through various intermediate frequency cable characteristics utilized practically, and amplify the received intermediate frequency signals into an optimal linear range of an analog-to-digital conversion according to a preset threshold, so as to flexibly and effectively compensate the attenuation of the intermediate frequency cable. The low-pass filter 4 is combined with the automatic gain control circuit 3 to compensate the influences of the automatic gain control circuit 3 on the in-band flatness while satisfying the out-band suppressing requirements of the receiving band at the same time. The analog-to-digital converter 5 is adapted to perform a sampling and digital demodulation on the received signals.

Seen from the above, in the first embodiment, the LC resonance circuit whose primary resonance frequency is the central frequency of the received signals receives the intermediate frequency signals and suppresses the transmitted signals and control signals, so that the receiving sensitivity of the system is enhanced and the reflection factor is improved. The transmitted signals and control signals are further filtered by the band-pass filter. The attenuation of the intermediate frequency cable is compensated by the automatic gain control circuit so as to provide a variable gain and reduce the in-band loss. The in-band flatness is compensated by the low-pass filter. Finally, the analog-to-digital converter performs a sampling and digital demodulation on the received signals.

In this embodiment of the present invention, through an organic combination of the above circuits, the indexes of the intermediate frequency receiving circuit in the microwave system are optimized and adjusted, so that the whole intermediate frequency receiving circuit may achieve the desired intermediate frequency receiving channel indexes, improve the in-band unflatness and reflection factor, enhance the suppressing degree of the transmitted intermediate frequency signals and low frequency control signals, improve the receiving sensitivity of the system, reduce the in-band loss, and provide a variable gain.

Preferably, in the first embodiment, the band-pass filter 2 may be a capacitor-coupled resonant band-pass filter. The capacitor-coupled resonant band-pass filter may be a four-stage wideband capacitor-coupled resonant band-pass filter with an input/output impedance of 50 ohm. The band-pass filter 2 is implemented by an inductor and a capacitor, so that the overall circuitry substantially utilizes the inductor and capacitor to keep consistency in the circuitry and enhance the cooperation and flexibility of the circuits.

Preferably, in the first embodiment, the automatic gain control circuit 3 may be an automatic gain control circuit with a dynamic range of 40 dB.

Figure 4:
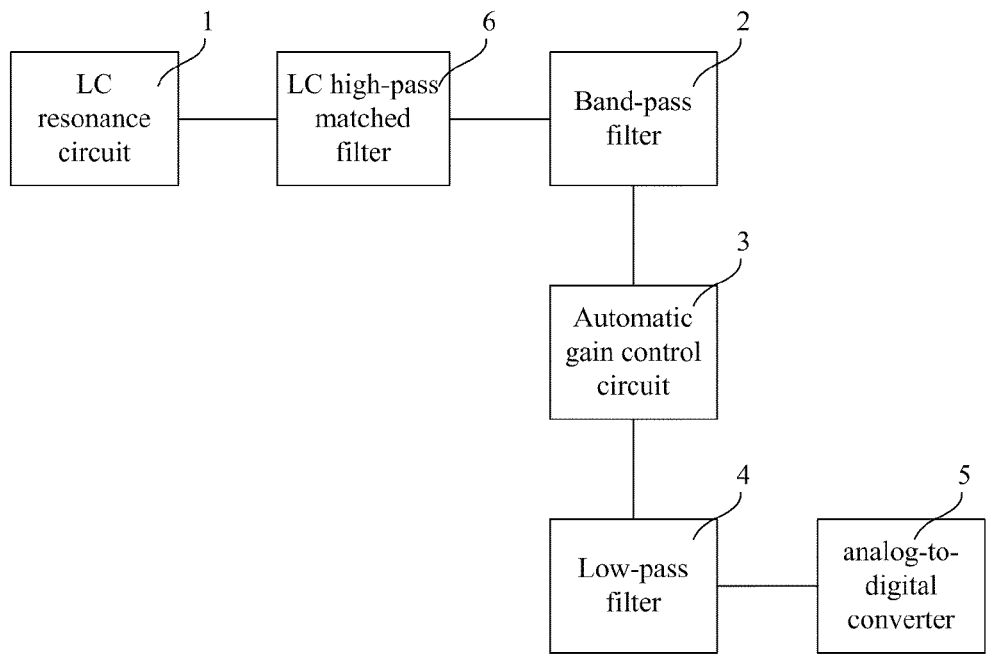
FIG. 4 is a schematic view of an intermediate frequency receiving circuit according to a second embodiment of the present invention.

Further, as shown in FIG. 4, the second embodiment of the intermediate frequency receiving circuit according to the present invention differs from the first embodiment in that, the LC resonance circuit 1 is connected to the band-pass filter 2 via the LC high-pass matched filter 6. The LC high-pass matched filter 6 is adapted to compensate the discreteness of the impedance of the amplifier based on that the LC resonance circuit suppresses the transmitted signals and control signals, so as to further enhance the receiving sensitivity and reflection factor of the system.

Figure 5:
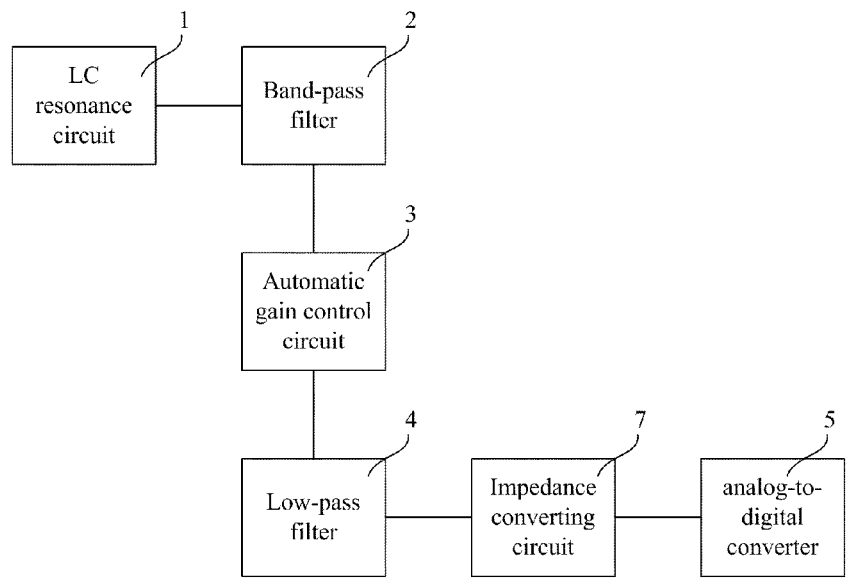
FIG. 5 is a schematic view of an intermediate frequency receiving circuit according to a third embodiment of the present invention.
Figure 6:
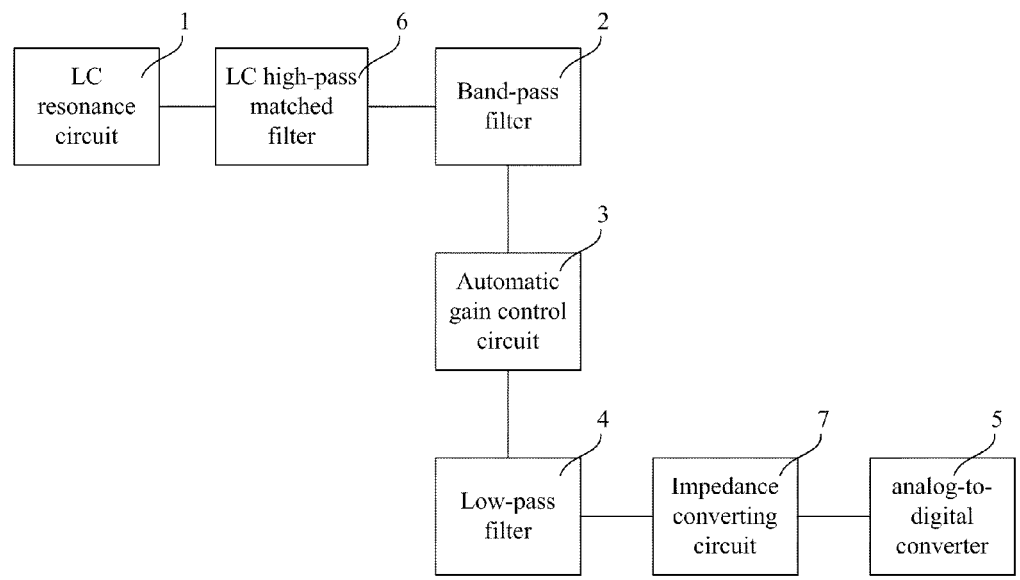
FIG. 6 is a schematic view of an intermediate frequency receiving circuit according to a fourth embodiment of the present invention.

Moreover, in the third embodiment of the intermediate frequency receiving circuit according to the present invention shown in FIG. 5 and the fourth embodiment of the intermediate frequency receiving circuit according to the present invention shown in FIG. 6, different from the first embodiment, the low-pass filter 4 is connected to the analog-to-digital converter 5 via an impedance converting circuit 7. The impedance converting circuit 7 is adapted to perform an impedance conversion on the received intermediate frequency signals and send the signals to the analog-to-digital converter 5 for sampling.

Figure 7:
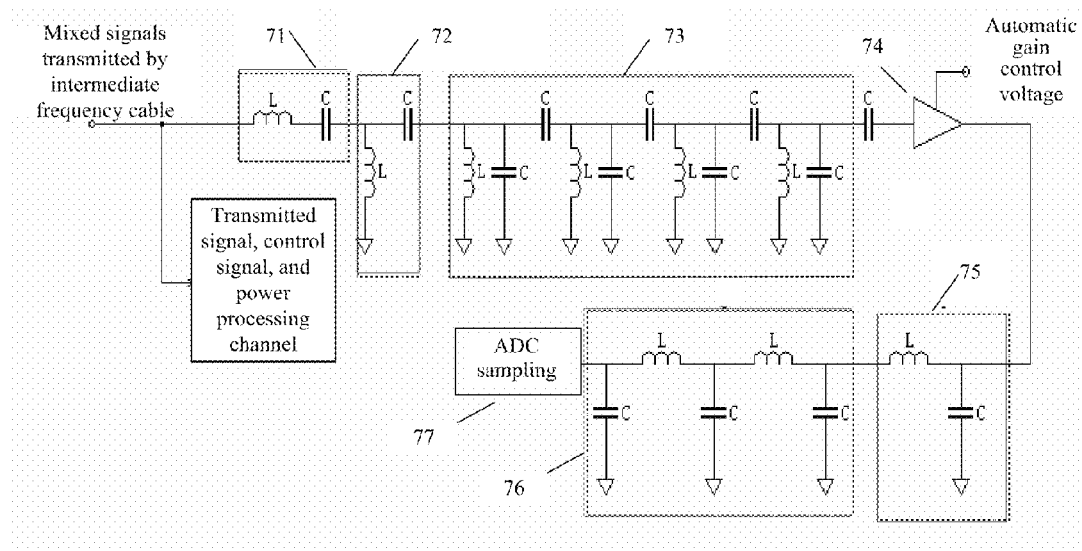
FIG. 7 is a schematic view of an intermediate frequency receiving circuit according to a fifth embodiment of the present invention.

FIG. 7 is a schematic view of the intermediate frequency receiving circuit according to the fifth embodiment of the present invention. First, an LC circuit 71 whose primary resonance frequency is a central frequency of the received signals separates the receiving channel from the other channels while receiving the intermediate frequency signals. Meanwhile, the transmitting channels sharing the same intermediate frequency interface may also adopt a similar circuit to make sure that the filters for individual channels no longer interfere with each other. An LC high-pass matched filter 72 is adapted to perform an impedance matching to compensate the discreteness of the impedance of the amplifier so as to ensure a desired reflection factor of the intermediate frequency port. A four-stage wideband capacitor-coupled resonant band-pass filter 73 with input impedance and output impedance of 50 ohm is designed so as to filter the transmitted intermediate frequency signals and low frequency control signals. Next, an automatic gain control circuit 74 with a dynamic range of 40 dB compensates the attenuation of the intermediate frequency cable and amplifies the received intermediate frequency signals into an optimal linear range of an analog-to-digital conversion according to a preset threshold. Then, an LC low-pass matched filter 75 and a low-pass filter 76 are designed to both satisfy out-band suppressing requirements of the receiving band and compensate the gain of the amplifier, which is not fully even in the wideband range. Finally, received intermediate frequency signals are subject to an impedance conversion and sent to the analog-to-digital converter (ADC) for sampling. Seen from the above, in this embodiment, critical indexes of the whole wideband intermediate frequency receiving channel may reach a desired level through a proper allocation of the channels.

Figure 8:
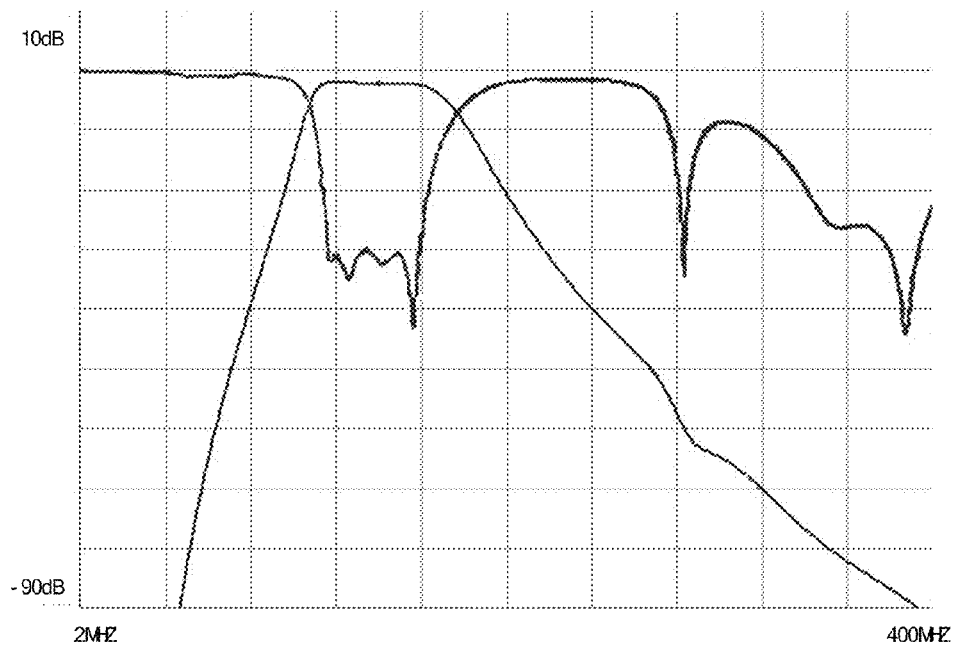
FIG. 8 is a schematic view showing the results of an emulation test on an intermediate frequency receiving circuit according to an embodiment of the present invention.

FIG. 8 is a schematic view showing the results of an emulation test on the intermediate frequency receiving circuit according to an embodiment of the present invention. The characteristics of all the devices and the PCB, including Q values of the inductor and conductor, parasitic capacitances of the protective devices, PCB windings, and the like, have been taken into account during the emulation. In FIG. 8, the central frequency of the band-pass filter is 140 MHz. The curve starting from 2 MHz on the horizontal axis is a transmission coefficient curve and the other curve is a transfer coefficient curve. According to the emulation results, in the embodiment of the present invention, the intermediate frequency receiving circuit has a port reflection factor of about −30 dB, an in-band unflatness (28 M) less than 0.2 dB, a suppressing degree of the transmitted intermediate frequency signals and low frequency control signals greater than 75 dB, a receiving sensitivity generally about −72 dBm in a 128 quadrature amplitude modulation (128 QAM) mode, an in-band loss lower than −2.5 dB (the gain in the emulation diagram is 0 dB, i.e., it is not amplified), a variable gain of 40 dB, and a group delay difference smaller than 2 nS.

On the contrary, in the conventional art, the port reflection factor is generally −15 dB, the suppressing degree of the transmitted intermediate frequency signals and low frequency control signals is greater than 60 dB, the receiving sensitivity is around −69 dBm in the 128 QAM mode, the insertion loss is generally 5 dB (when not amplified), and the in-band unflatness is lower than 1 dB.

Seen from the above comparison of the performance indexes, the embodiment of the intermediate frequency receiving circuit according to the present invention optimizes and adjusts the performance indexes of the intermediate frequency receiving circuit in the microwave system, so that the whole intermediate frequency receiving circuit provided may achieve the desired intermediate frequency receiving channel indexes, improve the in-band unflatness and reflection factor, enhance the suppressing degree of the transmitted intermediate frequency signals and low frequency control signals, improve the receiving sensitivity of the system, reduce the in-band loss, and provide a variable gain.

Figure 9:
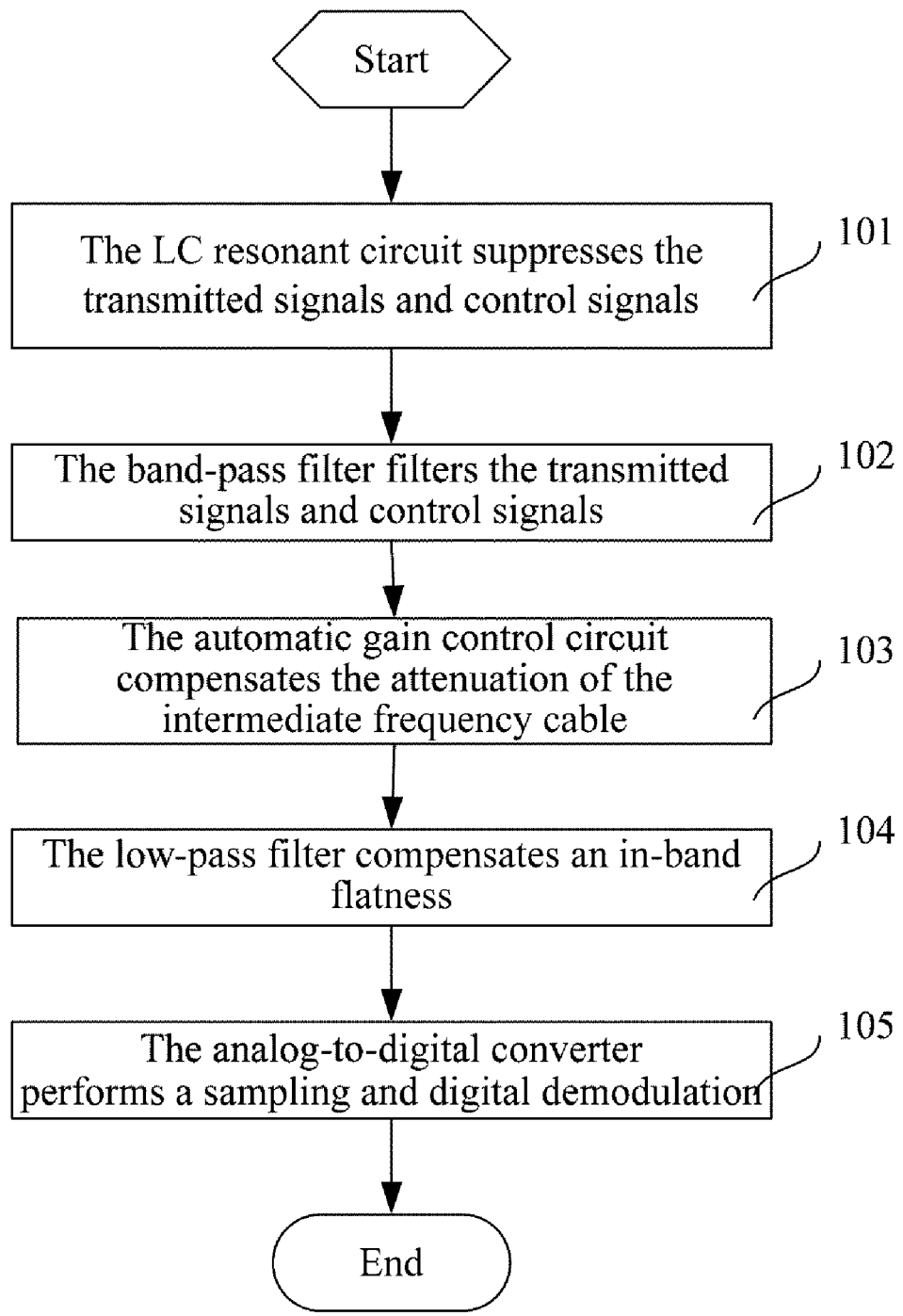
FIG. 9 is a flow chart of an intermediate frequency receiving method according to a first embodiment of the present invention.

Referring to FIG. 9, the embodiment of the present invention further provides an intermediate frequency receiving method. The method includes the following steps. In Step 101, an LC resonance circuit whose primary resonance frequency is a central frequency of received signals receives intermediate frequency signals and suppresses transmitted signals and control signals, so as to separate a receiving channel from a transmitting channel and a control channel. Further, the transmitting channel may also adopt an LC resonance circuit whose primary resonance frequency is a central frequency of the transmitted signals to further make sure that the filters for individual channels no longer interfere with each other. In Step 102, a band-pass filter performs a band-pass filtering on the received intermediate frequency signals to further filter the transmitted signals and control signals suppressed based on that the LC resonance circuit suppresses the transmitted signals and controls signals, so as to prevent the transmitted and control signals from influencing the received signals, thereby enhancing the receiving sensitivity of the system and improving the reflection factor. In Step 103, an automatic gain control circuit performs an automatic gain control according to various intermediate frequency cable characteristics utilized practically, and amplifies the received intermediate frequency signals into an optimal linear range of an analog-to-digital conversion according to a preset threshold, so as to flexibly and effectively compensate the attenuation of the intermediate frequency cable. In Step 104, a low-pass filter performs a low-pass filtering on the automatically gain-controlled intermediate frequency signals, so as to compensate the influences of the automatic gain control circuit on the in-band flatness while satisfying out-band suppressing requirements of the receiving band at the same time. Finally, in Step 105, an analog-to-digital converter performs a sampling and digital demodulation.

In the above first embodiment of the intermediate frequency receiving method according to the present invention, by suppressing the transmitted signals and control signals when receiving the intermediate frequency signals, the receiving sensitivity of the system is enhanced and the reflection factor is improved. The transmitted signals and control signals are further filtered by performing a band-pass filtering. The attenuation of the intermediate frequency cable is compensated by automatic gain control, so as to provide a variable gain and reduce the in-band loss. The in-band flatness is compensated by performing a low-pass filtering. Finally, the sampling and digital demodulation is performed by analog-to-digital conversion. Through an organic combination of the above operations, the indexes of the intermediate frequency receiving circuit in the microwave system are optimized and adjusted, so that the whole intermediate frequency receiving circuit provided may achieve the desired intermediate frequency receiving channel indexes, improve the in-band unflatness and reflection factor, enhance the suppressing degree of the transmitted intermediate frequency signals and low frequency control signals, improve the receiving sensitivity of the system, reduce the in-band loss, and provide a variable gain.

Preferably, in the first embodiment of the intermediate frequency receiving method according to the present invention, Step 102 may specifically include filtering the transmitted signals and control signals by a capacitor-coupled resonant band-pass filter. Step 103 may specifically include compensating the attenuation of the intermediate frequency cable by an automatic gain control circuit with a dynamic range of 40 dB.

Figure 10:
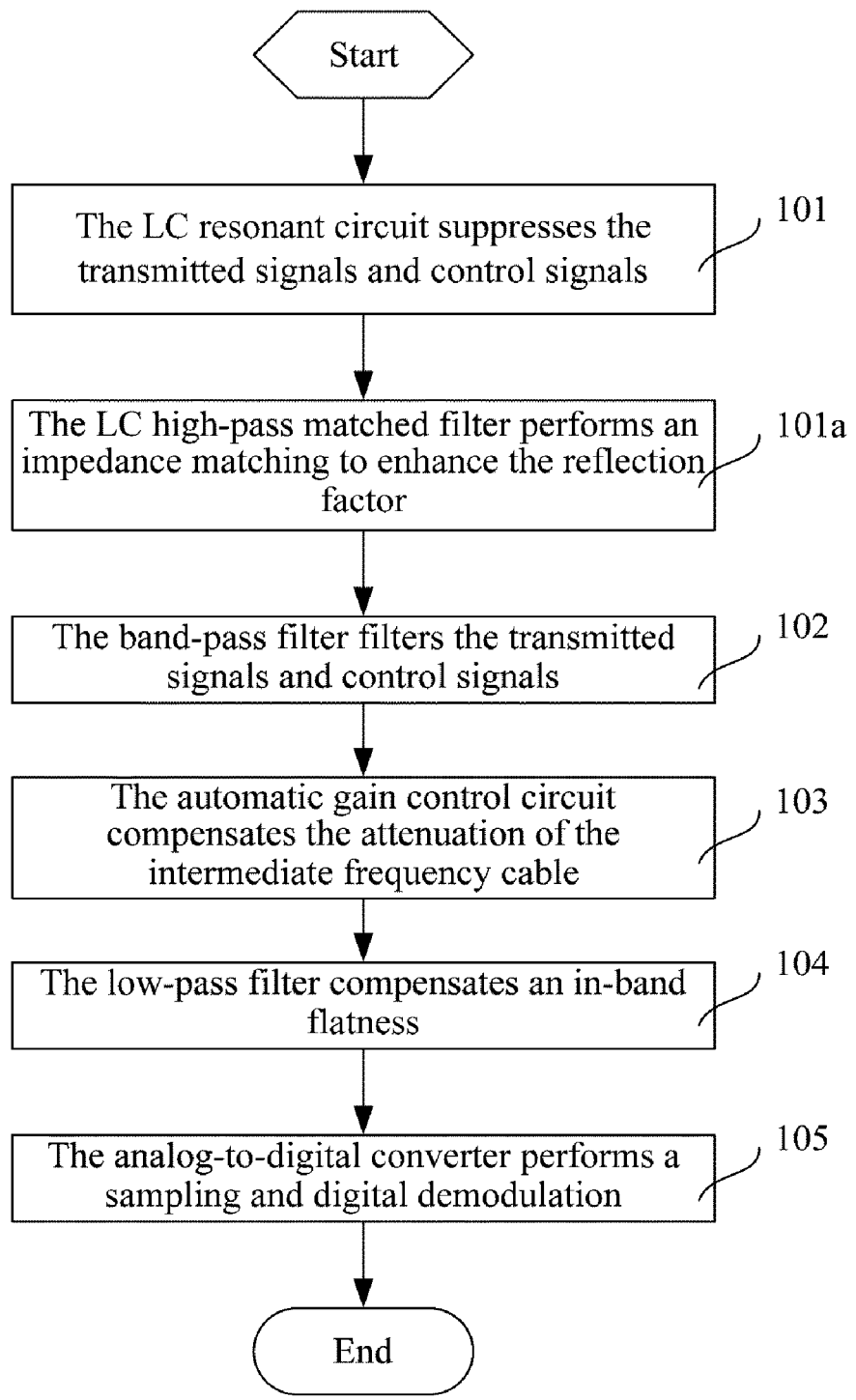
FIG. 10 is a flow chart of an intermediate frequency receiving method according to a second embodiment of the present invention.

Preferably, compared with the first embodiment of the intermediate frequency receiving method, the second embodiment of the intermediate frequency receiving method according to the present invention shown in FIG. 10 may further include Step 101*a* performed after Step 101. In Step 101*a*, an LC high-pass matched filter compensates the discreteness of the impedance of the amplifier and performs an impedance matching based on that the LC resonance circuit suppresses the transmitted signals and control signals, so as to further enhance the receiving sensitivity and the reflection factor of the system.

Figure 11:
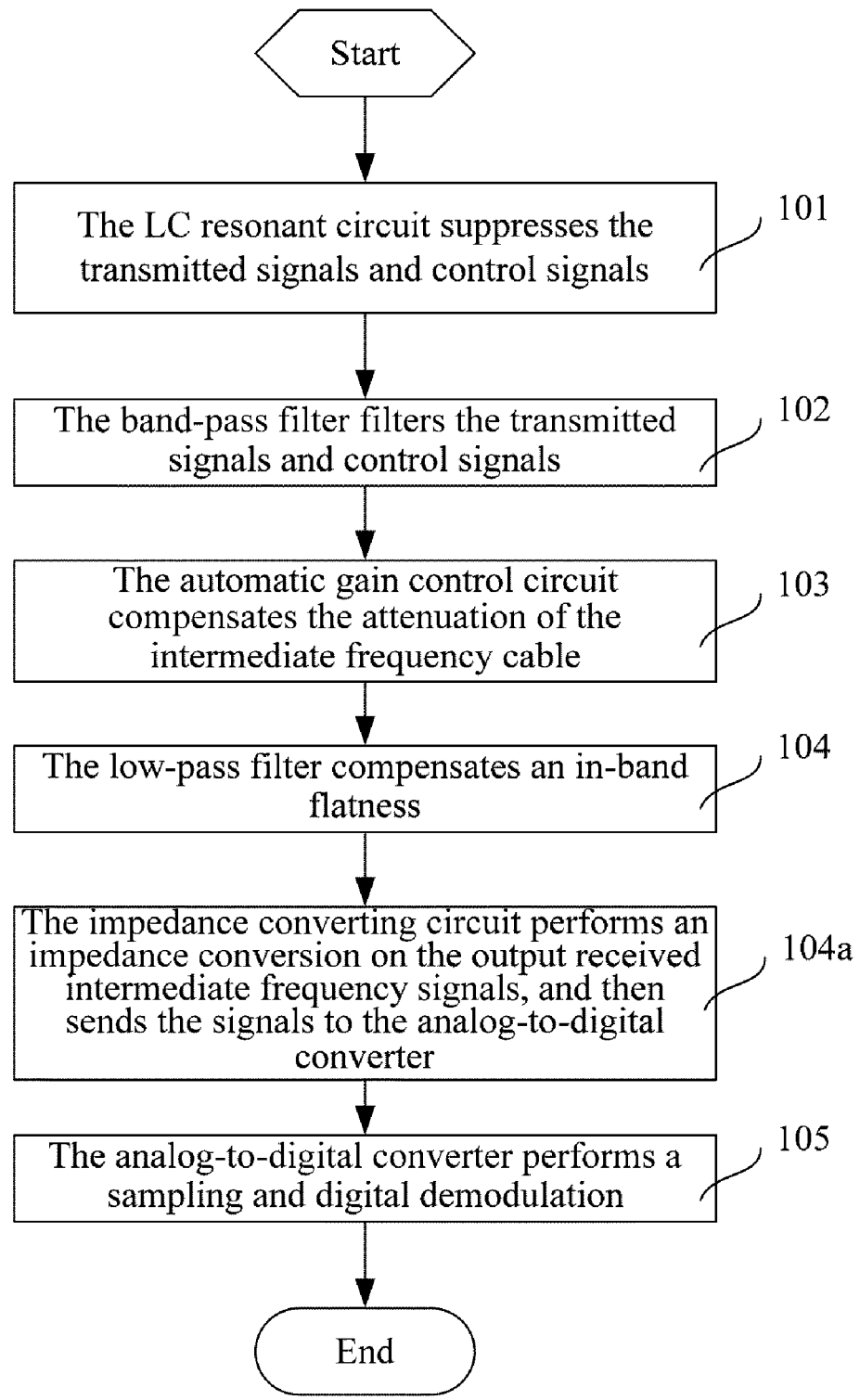
FIG. 11 is a flow chart of an intermediate frequency receiving method according to a third embodiment of the present invention.
Figure 12:
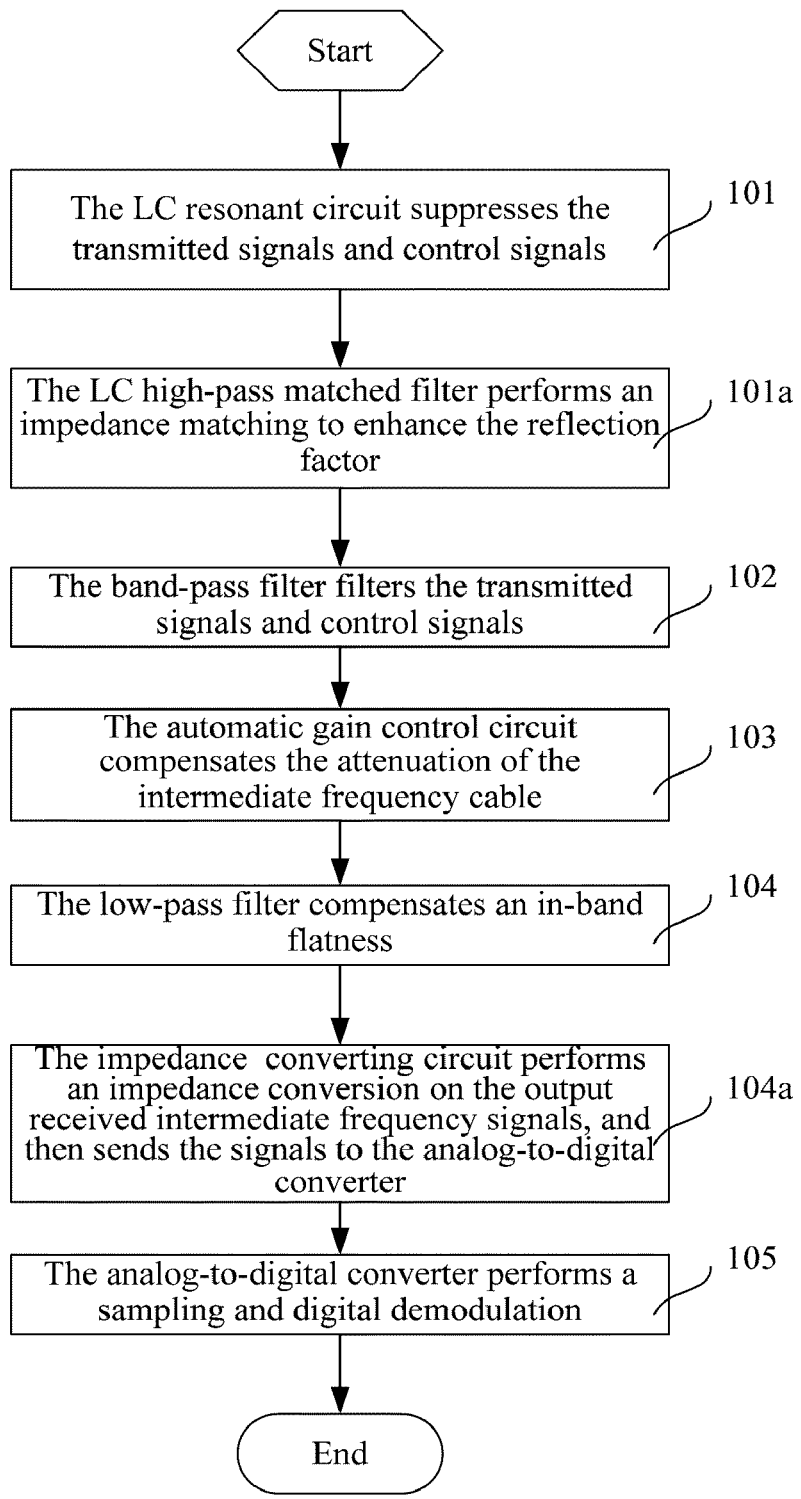
FIG. 12 is a flow chart of an intermediate frequency receiving method according to a fourth embodiment of the present invention.

Preferably, compared with the first embodiment of the IF receiving method, the third embodiment of the intermediate frequency receiving method according to the present invention shown in FIG. 11 and the fourth embodiment of the intermediate frequency receiving method according to the present invention shown in FIG. 12 may further include Step 104*a* performed after Step 104 and before Step 105. In Step 104*a*, an impedance converting circuit performs an impedance conversion on the signals and then sends the signals to the analog-to-digital conversion.

It should be noted that, those of ordinary skills in the art may understand that some or all of the steps in the method of the above embodiments may be performed by hardware under the instruction of a related program. The program may be stored in a computer readable storage medium such as a ROM/RAM, a magnetic disk, or a compact disc, and includes the steps in the above method when executed.

Finally, it should be understood that the above embodiments are only used to explain the technical solution of the present invention, but not to limit the present invention. In despite of the detailed description of the present invention with referring to above preferred embodiments, it should be understood that various modifications, changes or equivalent replacements can be made by those skilled in the art without departing from the spirit and scope of the present invention and are covered in the claims of the present invention.

What is claimed is:

1. An intermediate frequency receiving circuit, comprising:
    an inductor-capacitor (LC) resonance circuit, whose primary resonance frequency is substantially equal to a central frequency of received signals, and adapted to receive intermediate frequency signals and suppress transmitted signals and control signals;
    a band-pass filter, connected to the LC resonance circuit, and adapted to filter the transmitted signals and control signals;
    an automatic gain control circuit, connected to the band-pass filter, and adapted to compensate the attenuation of an intermediate frequency cable;
    a low-pass filter, connected to the automatic gain control circuit, and adapted to compensate an in-band flatness; and
    an analog-to-digital converter, connected to the low-pass filter, and adapted to perform a sampling and digital demodulation on the received signals.

2. The intermediate frequency receiving circuit according to claim 1, wherein the band-pass filter is a capacitor-coupled resonant band-pass filter.

3. The intermediate frequency receiving circuit according to claim 2, wherein the capacitor-coupled resonant band-pass filter is a four-stage wideband capacitor-coupled resonant band-pass filter with an input/output impedance of 50 ohm.

4. The intermediate frequency receiving circuit according to claim 1, wherein the automatic gain control circuit has a dynamic range of 40 dB.

5. The intermediate frequency receiving circuit according to claim 1, further comprising:
    an LC high-pass matched filter, connected between the LC resonance circuit and the band-pass filter, and adapted to increase a reflection factor.

6. The intermediate frequency receiving circuit according to claim 1, further comprising:
    an impedance converting circuit, connected between the low-pass filter and the analog-to-digital converter, and adapted to perform an impedance conversion on the received intermediate frequency signals and send the converted signals to the analog-to-digital converter.

7. The intermediate frequency receiving circuit according to claim 2, further comprising:
    an impedance converting circuit, connected between the low-pass filter and the analog-to-digital converter, and adapted to perform an impedance conversion on the received intermediate frequency signals and send the converted signals to the analog-to-digital converter.

8. The intermediate frequency receiving circuit according to claim 3, further comprising:
    an impedance converting circuit, connected between the low-pass filter and the analog-to-digital converter, and adapted to perform an impedance conversion on the received intermediate frequency signals and send the converted signals to the analog-to-digital converter.

9. The intermediate frequency receiving circuit according to claim 4, further comprising:
    an impedance converting circuit, connected between the low-pass filter and the analog-to-digital converter, and adapted to perform an impedance conversion on the received intermediate frequency signals and send the converted signals to the analog-to-digital converter.

10. The intermediate frequency receiving circuit according to claim 5, further comprising:

an impedance converting circuit, connected between the low-pass filter and the analog-to-digital converter, and adapted to perform an impedance conversion on the received intermediate frequency signals and send the converted signals to the analog-to-digital converter.

11. An intermediate frequency receiving method, comprising:

receiving intermediate frequency signals and suppressing transmitted signals and control signals;

performing a band-pass filtering on the intermediate frequency signals with the transmitted signals and control signals being suppressed;

performing an automatic gain control on the band-pass filtered intermediate frequency signals;

performing a low-pass filtering on the automatically gain-controlled intermediate frequency signals; and performing an analog-to-digital conversion on the low-pass filtered intermediate frequency signals.

12. The intermediate frequency receiving method according to claim 11, wherein the receiving the intermediate frequency signals and suppressing the transmitted signals are performed by an inductor-capacitor (LC) resonance circuit having a primary resonance frequency equal to a central frequency of received signals.

13. The intermediate frequency receiving method according to claim 11, wherein the performing a band-pass filtering on the intermediate frequency signals with the transmitted signals and control signals being suppressed comprises:

filtering, by a capacitor-coupled resonant band-pass filter, the transmitted signals and control signals in the intermediate frequency signals with the transmitted signals and control signals being suppressed.

14. The intermediate frequency receiving method according to claim 11, wherein the performing an automatic gain control on the band-pass filtered intermediate frequency signals comprises:

compensating, by an automatic gain control circuit with a dynamic range of 40 dB, the attenuation of an intermediate frequency cable.

15. The intermediate frequency receiving method according to claim 11, further comprising:

before performing a band-pass filtering on the intermediate frequency signals with the transmitted signals and control signals being suppressed, performing, by an LC high-pass matched filter, an impedance matching on the intermediate frequency signals with the transmitted signals and control signals being suppressed.

16. The intermediate frequency receiving method according to claim 11, further comprising: before performing the analog-to-digital conversion on the low-pass filtered intermediate frequency signals, performing, by an impedance converting circuit, an impedance conversion on the low-pass filtered intermediate frequency signals.

17. The intermediate frequency receiving method according to claim 12, further comprising: before performing the analog-to-digital conversion on the low-pass filtered intermediate frequency signals, performing, by an impedance converting circuit, an impedance conversion on the low-pass filtered intermediate frequency signals.

18. The intermediate frequency receiving method according to claim 13, further comprising: before performing the analog-to-digital conversion on the low-pass filtered intermediate frequency signals, performing, by an impedance converting circuit, an impedance conversion on the low-pass filtered intermediate frequency signals.

19. The intermediate frequency receiving method according to claim 14, further comprising: before performing the analog-to-digital conversion on the low-pass filtered intermediate frequency signals, performing, by an impedance converting circuit, an impedance conversion on the low-pass filtered intermediate frequency signals.

* * * * *